United States Patent [19]

Tsujimoto et al.

[11] 3,848,976

[45] Nov. 19, 1974

[54] METHOD AND APPARATUS FOR SYNCHRONIZED SHOOTING AND PROJECTION OF A MOVIE AND RECORDING AND PLAYBACK OF SOUND ON A TAPE

[75] Inventors: Noboru Tsujimoto; Katsuji Maruyama; Haruo Misawa, all of Suwa City, Japan

[73] Assignee: Chinon Industries Incorporated, Suwa, Japan

[22] Filed: Feb. 26, 1973

[21] Appl. No.: 335,794

Related U.S. Application Data

[62] Division of Ser. No. 187,333, Oct. 7, 1971, abandoned.

[30] Foreign Application Priority Data

Oct. 17, 1970 Japan .............................. 45-91398

[52] U.S. Cl. .............................. 352/17, 352/15

[51] Int. Cl. .............................. G03b 31/04

[58] Field of Search .............................. 352/12, 17, 5, 15, 31

[56] References Cited

UNITED STATES PATENTS

| | | | |
|---|---|---|---|
| 2,797,611 | 7/1957 | Anthony | 352/17 |
| 3,492,068 | 1/1970 | Baron | 352/12 |
| 3,690,746 | 9/1972 | Kotler et al. | 352/12 |

FOREIGN PATENTS OR APPLICATIONS

| | | | |
|---|---|---|---|
| 1,232,019 | 1/1967 | Germany | 352/17 |

*Primary Examiner*—Robert P. Greiner
*Attorney, Agent, or Firm*—Stevens, Davis, Miller & Mosher

[57] ABSTRACT

Method of synchronized shooting and projection of a movie and recording and playback of sound on a tape. Said method comprises steps of producing a pulse signal as a speed of reference with respect to a rate of movement of a movie film, recording said pulse signal on a tape together with sound by means of a tape recorder, reproducing the pulse signal and the sound from the tape by means of the tape recorder, detecting a phase difference between the pulse frequency of the reproduced pulse signal and the rate of film movement in a movie projector, and controlling the operation speed of the projector based on the detected phase difference. The rate of film movement in the projector can be synchronized with sound.

6 Claims, 10 Drawing Figures

METHOD AND APPARATUS FOR SYNCHRONIZED SHOOTING AND PROJECTION OF A MOVIE AND RECORDING AND PLAYBACK OF SOUND ON A TAPE

This is a division, of application Ser. No. 187,333, filed Oct. 7, 1971 now abandoned.

This invention relates to a method of and apparatus for synchronized shooting and projection of a movie and recording and playback of sound on a tape, such for example as a magnetic tape, wherein sound corresponding to scenes on a movie is recorded on and reproduced from the tape in synchronism with the movement of film.

Small movie camera fans have hitherto been anxious to add sound to their movies. It has been their strong desire that shooting and projection of a movie could be snychronized to recording and playback of sound or a narration of the scenes on the movie or a suitable music number on the tape. This involves nothing but a desire to move a step forward toward commercial movies which offer an atmosphere of harmony of scenes and sound.

It has hitherto been customary to rely on mechanical means to attain the end of synchronized shooting and projection of a movie and recording and playback of sound on a tape in conventional apparatus of this type. Difficulties have thus been faced with in achieving synchronism positively, in addition to the fact that the operation is very troublesome. This is due to the fact that to achieve synchronism between the rate of film movement and sound to such a degree that no discrepancies are recognized between scenes on the film and sound it requires to set an allowance at 1.5 frame or 0.5 second in time for the deviation of film frames when shooting and projection of the movie are carried out at a rate of 18 frames per second. it is very difficult to achieve synchronism of scenes and sound of such high precision by using simple apparatus. It has thus been very difficult to achieve complete synchronism between film movement and sound for small movie fans.

Deviation of film frames with respect to recorded or reproduced sound is mainly due to differences in operation between camera and tape recorder in shooting and projecting a movie and recording and a reproducing sound on a tape. First, starting, and stopping of a movie camera or projector and the amount of advanced film cannot be brought into synchronism with starting and stopping of a tape recorder and the amount of transported tape. Secondly, the tape inevitably has an excessive length because of the time required for starting and the inertia of rotation taking place when it stops rotating. This excess length of the tape is increased when starting and termination of operation of the tape recorder are repeated often.

Accordingly, an object of this invention is to provide a method of and apparatus for positively achieving synchronism between scenes on a movie and sound when the movie is shot and projected and the sound is recorded and reproduced on a tape.

This invention is characterized in that a pulse signal is produced as a speed of reference for the rate of movement of movie film and such pulse signal is recorded on a tape together with sound; the pulse signal as well as the sound is reproduced from the tape by means of a tape recorder so as to detect a phase difference between the pulse frequency of the pulse signal and the rate of movement of the movie film; and the operation speed of a movie projector is controlled in accordance with the phase difference, whereby the rate of movement of the movie film can be brought into synchronism with the reproduced sound.

This invention permits to positively achieve synchronism between scenes on film and sound in shooting a movie or projecting the same by using a pulse signal as a speed of reference as aforementioned.

This invention is incorporated in a movie camera having switch means adapted to open and close in conformity with the rotation of a shutter, a tape recorder having an oscillator adapted to produce pulses of a pulse signal in conjunction with the opening and closing of such switch means of the movie camera to record such pulses and sound on a tape, and a projector having a movie film advance mechanism which is adapted to be controlled by a phase difference detected between the pulse frequency of the pulse signal reproduced from the tape by the tape recorder and the rate of movement of the movie film.

By virtue of the structural features described above, this invention can positively control timing of operations of the movie camera and tape recorder and projector and tape recorder, thereby making it possible to achieve synchronism between shooting of a movie and recording of sound and projection of the movie and playback of the sound by simple means. Besides, by directly connecting the movie camera, tape recorder and projector to one another, it is possible to switch between recording and playback by a simple operation any time as required.

In another aspect of this invention, a pulse signal serving as a speed of reference synchronous with the film movement of a projector is recorded together with sound on the same tape.

Accordingly, this invention permits various elements of the movie camera, tape recorder and projector to perform inherent functions of theirs and makes it possible, in addition, to perform editing of film and tape, after-recording of sound, and substitution of a new recording for a portion of the old recording on a tape.

In another aspect of this invention, the starting of film movement in the camera is detected by detecting a variation in the values of a voltage applied on the terminals of the electric motor of the movie camera or a current passed therethrough, and a relay is actuated upon detection of the starting of film movement, so as to thereby control initiation of operation of the tape recorder.

Accordingly, this invention permits to carry out full control of starting and stopping of a tape recorder by detecting starting and stopping of a movie camera for simultaneous recording of sound and shooting of a movie or to achieve synchronism of high accuracy between film movement and sound to such a degree that deviation of film frames wtih respect to sound can be reduced to ± 1.5 frames or ± 0.1 second in time when shooting of the movie is carried out at a rate of 18 frames per second when the tape recorder is operated to record sound in synchronism with the shooting of the movie by the movie camera or to reproduce sound in synchronism with the projection of the film by the projector.

In still another aspect of this invention, the electric motor of a tape recorder is connected to the power source through change-over switch means for switching the directions of rotation of the motor between the normal direction and reverse direction, such change-over switch means being operative to switch the direction of rotation of the motor from the normal direction to the reverse direction or vice versa in conjunction with the operation of the button for interrupting a recording operation or playback operation.

Accordingly, this invention permits to instantly interrupt the movement of the tape recorder in conjunction with the operation of the button for interrupting a recording operation or playback operation, so that the inertia of the tape transport motor and tape take-up and supply means can be cancelled to facilitate remote control and at the same time the efficiency of brake application can be increased.

In further aspect of this invention, an electrically conducting tape is attached to a film moved in the projector and such electrically conducting tape is sensed by contactors provided in the projector so as to thereby synchronously effect control of the starting and termination of the tape recorder and projector.

Additional objects as well as features and advantages of this invention will become evident from the description set forth hereinafter when considered in conjunction with the accompanying drawings, wherein.

The principles on which this invention is based will first be explained with reference to FIG. 1 to FIG. 3.

Figure 1:
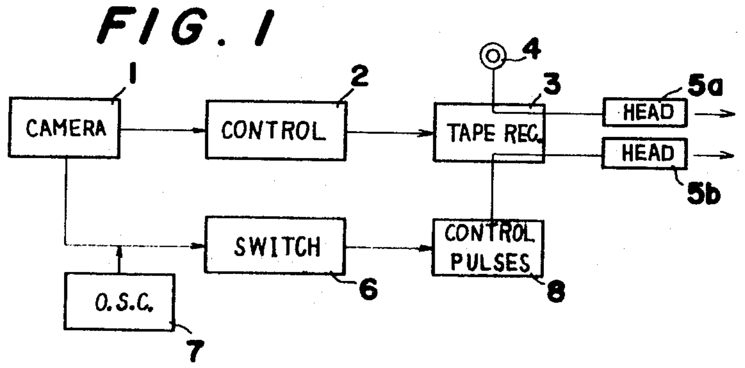
FIG. 1, FIG. 2 and FIG. 3 are block diagrams showing the principles of the apparatus according to this invention, FIG. 1 showing the apparatus used for movie taking and sound recording, FIG. 2 showing the apparatus used for film projection and sound reproduction and FIG. 3 showing the apparatus used for after-recording.

FIG. 1 shows an apparatus according to this invention used for movie taking and sound recording. If a shutter of a movie camera is triggered, a tape recorder start stop control section 2 which detects the starting of the movie camera 1 will operate a tape recorder 3, which has been brought to a recording stand-by position, as soon as the shutter rotates, and the sound from a microphone 4 is recorded through a first magnetic head 5*a* on a magnetic tape in its first channel.

On the other hand, a pulse producing switch 6 synchronous with the shutter of the movie camera 1 forms the output of a recordable frequency oscillator 7 into speed control pulses 8 as soon as the movie camera is started, and the pulses produced are recorded through a second magnetic head 5*b* on the magnetic tape in its second channel. That is, while the sound is recorded in one channel of a dual channel tape recorder 3, the pulses representing variations in the rate of exposed frames of a film caused by various factors in shooting a movie are recorded in the other channel as a pulse signal speed synchronous with the film movement.

Figure 2:
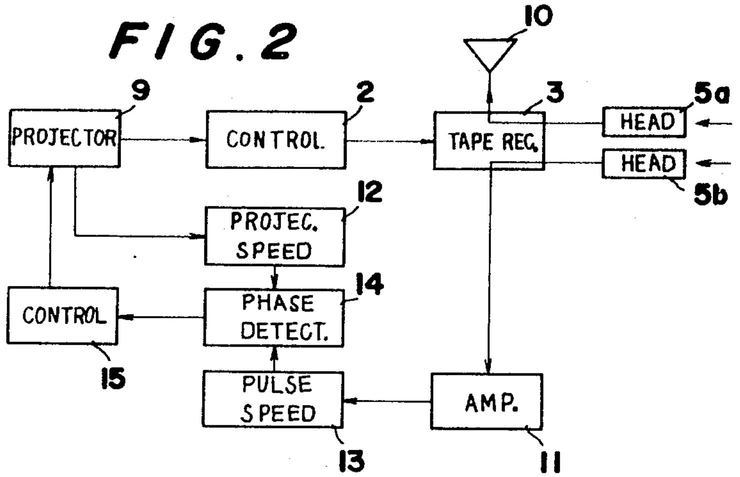

FIG. 2 shows an apparatus according to this invention used for projection of the movie taken by the apparatus of FIG. 1 and playback of the sound recorded on the tape by tape recorder 3 of the apparatus of FIG. 1. If a projector 9 is started, the film will be advanced to a scene start position. When the film is advanced to such position, the start stop control section 2 of tape recorder 3 detects such position and operates tape recorder 3 which has been brought to a playback stand-by position, so that the sound recorded in the first channel is reproduced from a speaker 10 through first magnetic head 5*a*.

On the other hand, the speed control pulses recorded in the second channel are reproduced through second magnetic head 5*b* and amplified by a pulse amplifier 11. If a phase difference is detected between a projector speed 12 and an amplified speed control pulse speed 13 by a phase detector 14, projector speed 12 is controlled by a speed control section 15 in accordance with the detected phase difference, so that the projector is operated at a rate corresponding to the speed control pulse speed 13. That is, the pulse signal recorded in the second channel of the tape recorder brings the film movement of projector 9 into accord with pulse signal speed 13 at the time of projection and sound playback, thereby achieving a complete synchronism between sound reproduced from tape recorder 3 and scenes on the movie.

Figure 3:
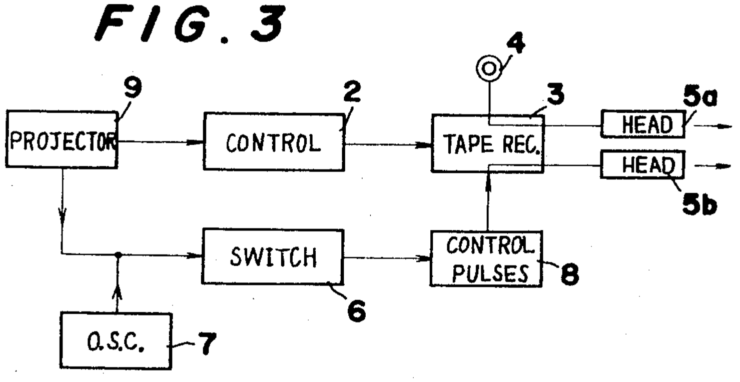

FIG. 3 shows an apparatus according to this invention used for after-recording. If projector 9 is started and the film in projector 9 is brought to the scene start position, tape recorder start stop control section 2 detects such position and operates tape recorder 3 which has been brought to the recording stand-by position, so that the sound from microphone 4 is recorded in the first channel through first magnetic head 5*a*. On the other hand, pulse producing switch 6 operated in accordance with the film movement in the projector forms the output of recordable frequency oscillator 7 into speed control pulses 8 which are recorded in the second channel through the second magnetic head 5*b* of tape recorder 3.

It will thus be appreciated that when a movie shot without any sound being recorded on a tape is projected it is possible to record sound on a tape which is synchronous with scenes on the movie if the film starting position is set to coincide with the tape starting position.

If it is desired to cut a certain portion of the film, it is possible to do so by detecting by this apparatus the portion of the tape corresponding to the scenes on film to be cut as subsequently to be described. It is also possible to substitute a type of sound matching a certain scene on the film for the sound already recorded on the tape by depressing a sound substitution button mounted on tape recorder 3.

One embodiment of the apparatus according to this invention will now be explained with reference to FIG. 4 in which 21 is a movie camera, 22 a tape recorder and 23 a projector.

When it is desired to shoot a movie and record sound in synchronism with scenes on the movie, a socket 24 provided on a side wall of camera 21 is connected to sockets 25 and 26 provided on a side wall of tape recorder 22 with a cord 29 having plugs 27 and 28 attached to opposite ends thereof. Then, a slide switch 30 is set at a synchronization indication position (the position shown in the figure) and the camera and tape recorder are started.

When the movie shot and the sound recorded by the apparatus according to this invention are projected and reproduced by projector and tape recorder respectively, a socket 31 provided on the side wall of tape recorder 22 and a socket 32 provided on a side wall of projector 23 are connected together by a cord 35 having plugs 33 and 34 at opposite ends thereof. Then, projector and tape recorder are started to project the movie and reproduced the sound by setting slide switch 30 in the synchronization indication position as aforementioned.

In performing an after-recording operation, socket 26 and a socket 36 which is provided on a side wall of projector 23 are connected together by a cord 29 having plugs 37 and 38 at opposite ends thereof, in addition to cord 35 connected between tape recorder and projector at the time of projection and playback. Then, after-recording is carried out by setting slide switch 30 at the synchronization indication switch.

When it is desired to substitute sound on another program for the sound already recorded in a certain portion of the tape, sockets 31 and 32 are connected together by cord 35 having plugs 33 and 34 and projector 23 is started after slide switch 30 is set at a sound editing indication position (rightward of the position in which the switch is disposed in the figure). A push button switch 40 is depressed when the film being projected has reached a point where the scene requires substitution of sound, thereby permitting to edit the sound record on the tape.

Circuits comprising one embodiment of the apparatus according to this invention will be described with reference to FIG. 5.

Figure 4:
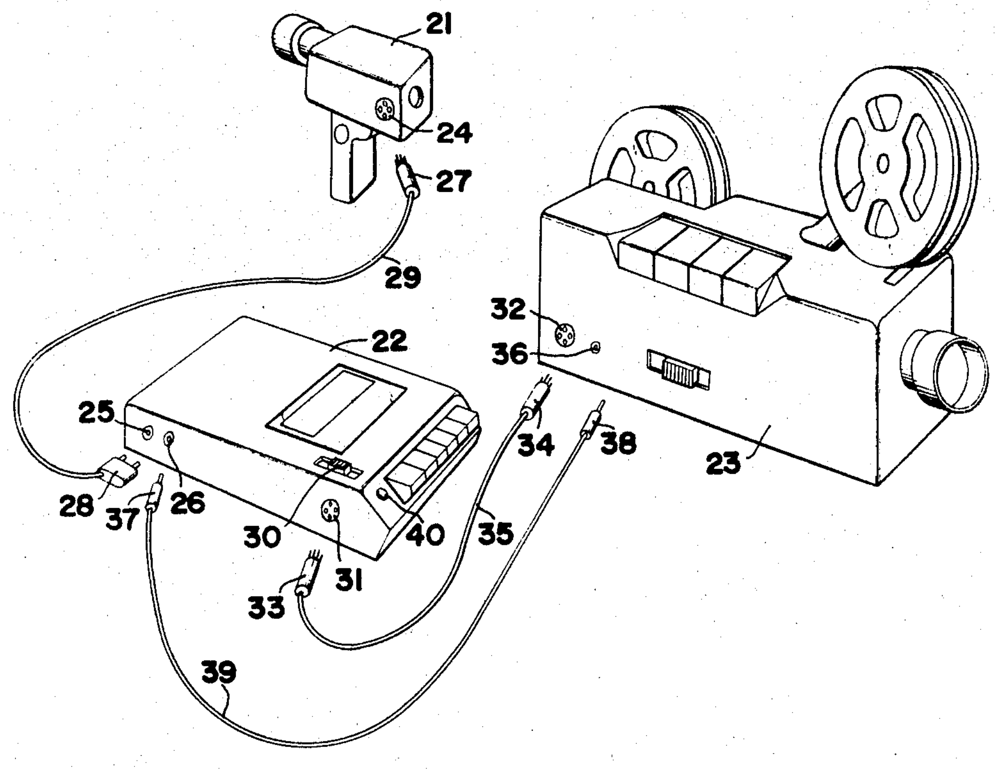
FIG. 4 is an exterior view of one embodiment of the apparatus according to this invention.
Figure 5:
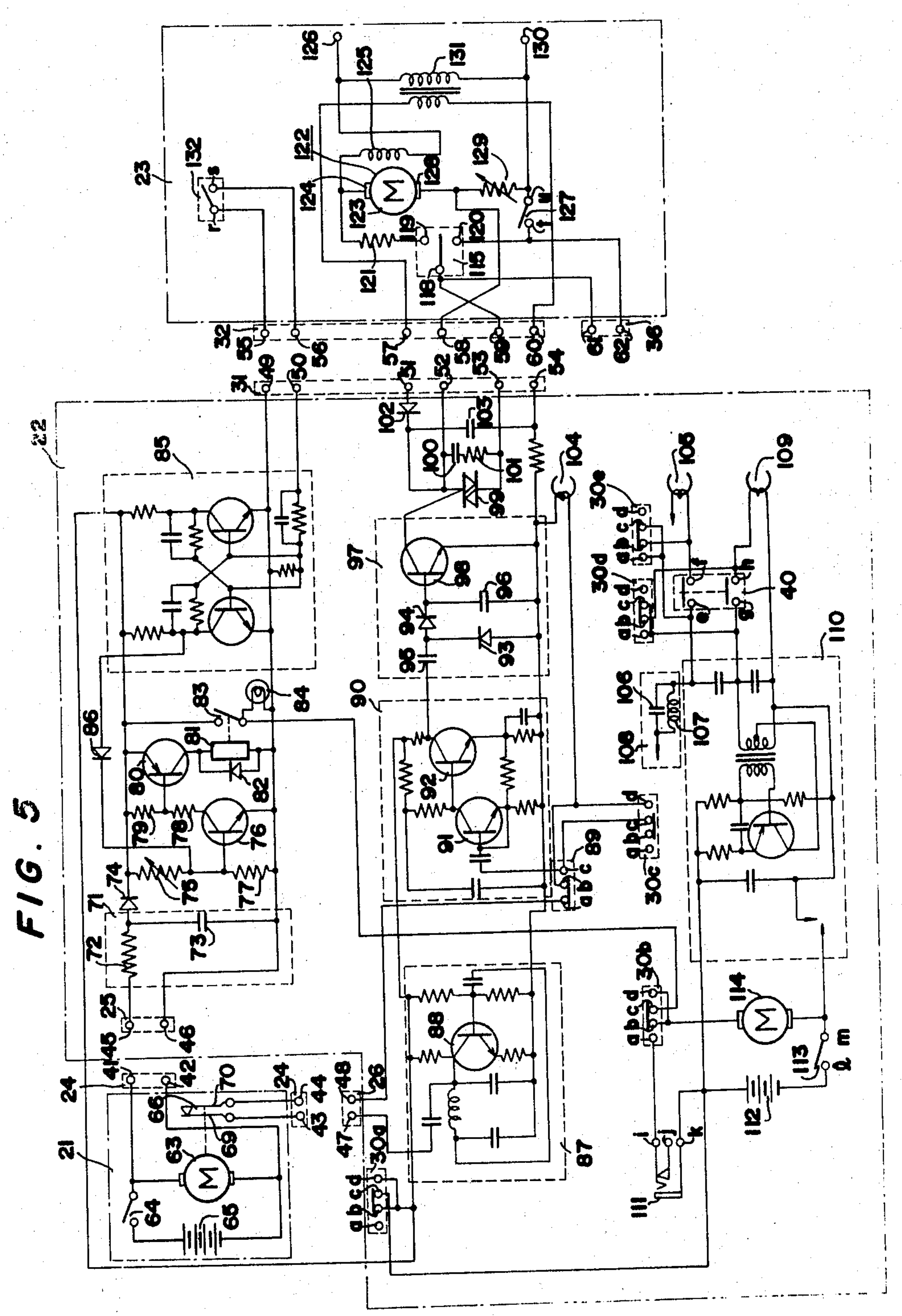
FIG. 5 shows circuits comprising one embodiment of the apparatus according to this invention and a system for operating the same.

In FIG. 5 circuits 21, 22 and 23 aach enclosed by single dot-and-dash lines are circuits for the movie camera, tape recorder and projector respectively. 24 is the socket provided on the side wall of movie camera 21 described with reference to FIG. 4. Terminals 41, 42, 43 and 44 constitute contacts of socket 24. 25, 26 and 31 are the sockets provided on the side wall of tape recorder 22. Terminals 45, 46, 47, 48, 49, 50, 51, 52, 53 and 54 constitutes contacts of sockets 25, 26 and 31 respectively. 32 and 36 are the sockets provided on the side wall of projector 23, and terminals 55, 56, 57, 58, 59, 60, 61 and 62 constitute contacts of sockets 32 and 36 respectively.

Slide switches 30*a*, 30*b*, 30*c*, 30*d* and 30*e* provided on circuit terminals and indicated by broken lines are coupled to a knob of slide switch 30 provided on the case of tape recorder 22 as explained with reference to FIG. 4 and adapted to move to left, center and right positions in slideing motion so as to pass current between terminals *a* and *b*, *b* and *c*, and *c* and *d* or cut off a supply of current thereto.

Figure 6:
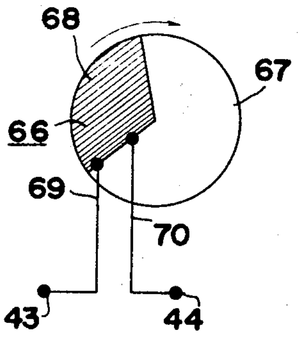
FIG. 6 is a view in explanation of the pulse producing switch used in the apparatus according to this invention.

In the figure, 63 is an electric motor for the movie camera which is connected at opposite ends thereof to positive and negative electrodes of a cell or power source 65 through a switch 64 and to terminals 41 and 42. 66 is a pulse producing switch adapted to open or close as electric motor 63 rotates and constructed as shown in FIG. 6.

A segmental electrically conducting material portion 68 is shown in FIG. 6 as being integrally connected to an insulating disk 67 for a peripheral extent of about one-third the circumference. Brushes 69 and 70 electrically connected to the aforementioned terminals 43 and 44 are mounted on a radial line of disk 69 for resilient contact with the conducting material portion 68 of disk 67. Disk 67 is coupled mechanically to the shutter to rotate in conjunction with the rotation of the shutter, so that terminals 43 and 44 repeatedly open and close.

The numeral 71 in FIG. 5 is a delay circuit comprising a resistor 72 and a capacitor 73. Circuit 71 is connected at its input side to terminal 45 and at its output side to a base of a switching transistor 76 through a diode 74 and a variable resistor 75. The base is grounded through a resistor 77 and the emitter of transistor 76 is also grounded, with the collector thereof being connected to a terminal *b* of slide switch 30*a* through resistors 78 and 79. Terminals *b* and *d* are electrically connected. Switching transistor 76 is fired when a potential of its base reaches a certain level and not fired when the potential is below such level.

The numeral 80 is also a switching transistor connected such that it is operated when transistor 76 is operated. Its base is connected to the junction of resistors 78 and 79, its emitter is connected to the terminal *b* of slide switch 30*a*, and its collector is grounded through an exciting coil of a relay 81. A diode 82 is connected to opposite ends of the coil.

83 is a switch adapted to open and close when an exciting current is passed to the coil of relay 81 and inserted between the terminal *b* of slide switch 30*a* and the terminal *c* of slide switch 30*b*.

84 is a pilot lamp connected between the terminal *c* of slide switch 30*b* and ground.

85 is a flip-flop circuit. The terminal 50 of socket 31 is connected to a trigger input side of circuit 85 and the terminal 49 thereof is connected to its ground side, with an output side of circuit 85 being connected to base of transistor 76 through a diode 86. The terminal 46 of socket 25 is also grounded. A power source input side of circuit 85 is connected to the terminal *b* of slide switch 30*a*.

87 is a known oscillator circuit comprising a transistor 88 and connected at its power source input side to the terminal *b* of slide switch 30*a* and at its output side to the terminal 47 of socket 26. The other terminal 48 of socket 26 is connected to a terminal *a* of a slide switch 89 connected either to a playback button or recording button of tape recorder 22 to open and close the switch.

90 is an amplifier circuit comprising transistors 91 and 92 and connected at its input side to the terminal *c* of slide switch 30*c* through a terminal *c* of slide switch 89 and at its power source input side to the terminal *b* of slide switch 30*a*, with its output side being connected to an input side of a known rectifier circuit comprising diodes 93 and 94 and capacitors 95 and 96. Circuit 97 is connected at its output side to the base of a switching transistor 98 whose emitter is grounded and collector is connected to the gate of a bidirectional thyristor 99 which will open and close upon receipt of a pulse signal to perform a switching action.

Thyristor 99 is connected at opposite ends thereof to the terminals 52 and 53 of socket 31, with a series circuit of a capacitor 100 and a resistor 101 being inserted between terminals 52 and 53. A diode 102 is interposed between terminal 52 and terminal 51, and a capacitor 103 is connected between terminals 54 and 51 through diode 102.

104 is a magnetic head for recording and reproducing the aofrementioned speed control pulses connected at one end thereof to the terminal *b* of slide switch 89 as well as to the terminal *d* of slide switch 30*c* and grounded at the other end thereof.

105 is a magnetic head for recording and reproducing sound comprising one terminal connected to a terminal *f* of pushbutton switch 40 as well as to the terminal *b* of slide switch 30*e* and the other terminal connected to an amplifier circuit (not shown). The terminal *c* of slide switch 30*e* is connected to the terminal *a* of slide switch 30*e*, to a terminal *e* of pushbutton switch 40, and to a circuit 108 comprising a capacitor 106 and an inductance 107 connected to each other in parallel.

The terminal *b* of slide switch 30*d* is connected to a terminal *h* of pushbutton switch 40 as well as to one end of an eraser head 109 whose other end is connected to an output side of an oscillator circuit 110. The terminal *a* of slide switch 30*d* is connected to a terminal *g* of pushbutton switch 40 as well as to a ground side of oscillator circuit 110.

111 is a jack having terminals *i*, *j* and *k*, with terminal *i* being connected to the terminal *a* of slide switch 30*b* and terminal *j* being connected to terminal *k* as well as to the positive electrode of a cell or power source 112. The negative electrode of power source 112 is connected to the terminal *b* of slide switch 30*b* through a main switch 113 and an electric motor 114, with terminal *b* being connected to terminal *d*. The junction of the terminal *k* of jack 111 and the positive electrode of power source 112 is connected to the terminal *c* of slide switch 30*a* as well as to a power source input side of oscillator circuit 110. A terminal *m* of main switch 113 is connected to the terminal 49 of socket 31 as well as to the ground side of oscillator circuit 87, amplifier circuit 90 and rectifier circuit 97.

Figure 7:
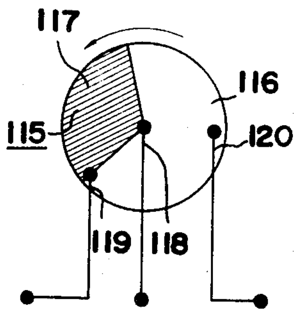
FIG. 7 is a view in explanation of the pulse producing and screening speed control switch.

Projector circuit 23 will now be described. 115 is a projected film movement rate control switch which is constructed as shown in FIG. 7.

More specifically, FIG. 7 shows a segmental electrically conducting material portion 117 as being integrally mounted on an insulating disk 116 to extend for a peripheral extent of about one-third the circumference. Brushes 118, 119 and 120 are secured to a center of disk 116 and in positions on the circumference of disk 116 disposed at 120° with respect to the center of the disk so as to resiliently contact the disk. Since disk 116 rotates by being mechanically associated with the film movement rate, it functions as a sort of double throw switch.

As aforementioned, the brush 118 of switch 115 is connected to the terminal 59 of socket 32 as well as to the terminal 61 of socket 36. Brush 119 is connected, through a resistor 121, to a brush 124 of an armature 123 of an electric motor 122 as well as to a power source terminal 126 through a field coil 125. Brush 120 is connected to the terminal 62 of socket 36 as well as to a terminal *t* of a switch 127.

A brush 128 of armature 123 is connected to the terminal 58 of socket 32 as well as to a power source terminal 130 through a variable resistor 129. The junction of variable resistor 129 and power source terminal 130 is connected to a terminal *u* of switch 127. A transformer 131 is inserted between power source terminals 126 and 130 and has a secondary coil which is connected at opposite ends thereof to the terminals 57 and 60 of socket 32 respectively whose terminals 55 and 56 are connected to terminals *r* and *s* respectively of a normally open switch 132.

Operation of the circuits described above will be described. When it is desired to shoot a movie and record sound synchronously with scenes on the movie, the operation described with reference to FIG. 4 is performed. This results in the terminals 41 and 45 and 42 and 46 of sockets 24 and 25 and the terminals 43 and 47 and 44 and 48 of sockets 24 and 26 being electrically connected, and at the same time the sliders of sliding switches 30*a* to 30*e* are set at the indicated positions or on terminals *b* and *c*, so that a current is passed between terminals *b* and *c*. The contact of slide switch 89 is also set at the illustrated position, so that a current is passed between terminals *a* and *b*.

If the shutter of camera 21 is actuated after the main switch 113 of tape recorder 22 is closed at this time, main switch 64 will close and at the same time the potential of power source 65 will be impressed on opposite ends of electric motor 63 as well as on the base of transistor 76 through delay circuit 71, diode 74 and variable resistor 75. Since delay circuit 71 is provided, a time constant will be produced and hence there is a time lag in the appearance of the transistor 76 operating potential in the base thereof corresponding to the time of the time constant. Accordingly, the starting of transistor 76 will be delayed as compared with the starting of electric motor 63.

Since transistor 76 is a switching transistor, a current is passed between its emitter and its collector and the base of transistor 80 is grounded through resistor 78, so that transistor 80 is also fired and an exciting current flows to the coil of relay 81 connected to the collector of transistor 80. This closes switch 83, thereby forming a closed circuit comprising switch 83, slide switch 30*b*, electric motor 114, switch 113, power source 112 and slide switch 30*a*. In this way, the electric motor 114 of tape recorder 22 is started with a slight time lag with respect to the electric motor 63 of movie camera 21.

Figure 9:
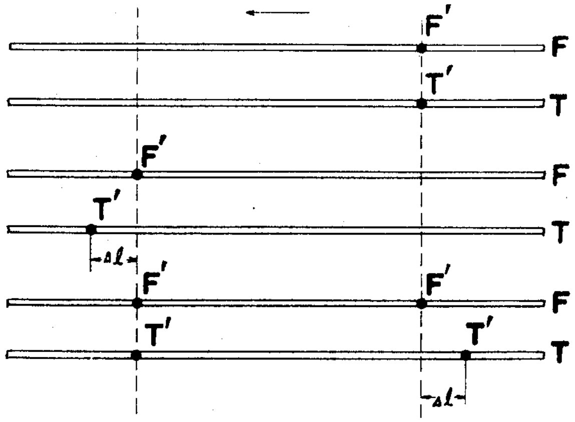
FIG. 9 and FIG. 10 are views in explanation of the principles for synchronizing the movements of the movie film and tape.

The reason why the starting of the electric motor 114 of tape recorder is delayed as compared with the starting of the electric motor 63 of movie camera 21 will be described with reference to FIG. 9 wherein F is a film in the camera and T is a tape. As well known, film F and tape T are moved as the electric motor of the movie camera and the electric motor of the tape recorder rotate respectively for shooting a movie and recording sound.

If the electric motors 63 and 114 of movie camera 23 and tape recorder 22 respectively are started simultaneously to advance film F and tape T in the direction of an arrow after points F' and T' on the film and tape are set at starting points as shown in FIG. 9A and if supply of power to motors 63 and 114 is cut off when point F' on film F and point T' on tape T corresponding to point F' have reached stop points, interruption of the rotation of the electric motor 114 of tape recorder 22 will take place later than interruption of the rotation of the motor 63 of movie camera 21 because of the inertia produced by a flywheel in the former. Accordingly, point T' on tape corresponding to point F' on film F moves ahead of point F' a distance $\Delta l$ as shown in FIG. 9B.

Assuming that a cycle of starting and stopping film F and tape T film repeated n times, deviation of tape T with respect to film F will correspond to the product of $\Delta l$ and $n$. The greater the frequency of the cycle, the greater will be the deviation, thereby making it impossible to effect sound synchronization with scenes on the movie.

According to this invention, this problem is obviated by delaying the starting of tape T such that the starting point T' on tape T is disposed behind the starting point F' on film F by the distance $\Delta l$ as shown in FIG. 9C. This makes it possible to achieve sound synchronization with scenes on the movie. The time required to position the starting point T' of tape T behind the starting point F' of film F by the distance $\Delta l$ can be obtained as the quotient of $\Delta l$ and the film movement rate, and the time constant of delay circuit 71 is obtained by taking into consideration the matter described above.

As soon as the electric motor 114 of tape recorder 22 is started, the output of emitter follower oscillator 87 is formed into a time control pulse signal by pulse producing switch 66 which is coupled to the shutter of movie camera 21 and repeatedly open and close. The pulse signals produced are transmitted to head 104 through slide switch 89 to be recorded in the second channel.

On the other hand, sound introduced through a microphone (not shown) at this time is recorded in the first channel through head 105. It will thus be appreciated that according to this invention a variation in the exposed frame movement rate caused by various factors involving the movie camera at the time of shooting a movie can be recorded on the tape in the other channel of dual channel tape recorder 22 as a pulse signal speed corresponding to the variation in the rate of exposed frames while sound is recorded in one channel thereof.

Projection of the movie shot by the apparatus described above and playback of the sound synchronous with scenes on the film will now be described.

If the operation described with reference to FIG. 4 is performed, the terminals 49 and 55, 50 and 56, 51 and 57, 52 and 58, 53 and 59, and 54 and 60 of sockets 31 and 32 will be electrically connected to each other, and the contacts of slide switches 30*a* and 30*e* are set at positions explained with reference to movie shooting and sound recording or in the illustrated positions, so that the terminals *b* and *c* of slide switches 30*a* to 30*e* are electrically connected. The terminals *b* and *c* of slide switch 89 are also electrically connected.

If the switch 113 of tape recorder 22, and the switch 127 of projector 23 are closed and the power source terminals 126 and 130 are connected to the power source, a closed circuit comprising field coil 125, armature 123 and variable resistor 129 will be formed. This starts the electric motor 122 of projector 23 to move a film.

Figure 8:
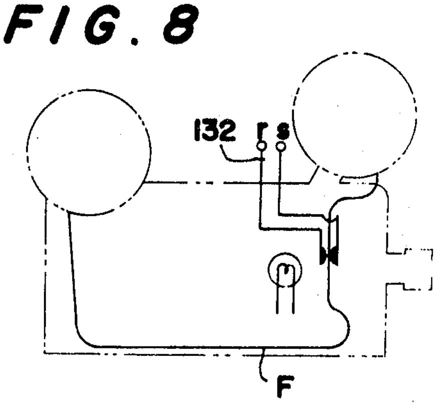
FIG. 8 is a view in explanation of the principles for detecting scene movement position of the movie film.

An electrically conducting tape is adhered to the scene start position on the film and a current can be passed thereto. When the electrically conducting pattern provided at the scene start position on the film reaches where normally open switch 132 is disposed in the path of movement of film F in FIG. 8, a current is passed between the terminals *r* and *s* of switch 132, thereby triggering flip-flop circuit 85. Flip-flop circuit 85 is thus operated and its output operates switching transistor 76 through diode 86. This causes a tape on tape recorder 22 to start moving in synchronism with the start of scenes on the film F as described with reference to movie shooting and sound recording previously.

Starting of tape recorder 22 causes pulses of the speed control pulse signal reproduced by head 104 to be amplified by the amplifier circuit 90 comprising transistors 91 and 92 and formed into outputs of transistor 92 which intermittently operate transistor 98 through rectifier circuit 97. This alternately passes a current between the emitter and collector of transistor 98 and cuts off the supply of current thereto and thereby causes transistors 98 to produce pulses to drive bidirectional thyristor 99. Thyristor 99 serves as a sort of opening and closing switch driven by the speed control pulse signal to repeatedly pass and cut off current supply.

Figure 10:
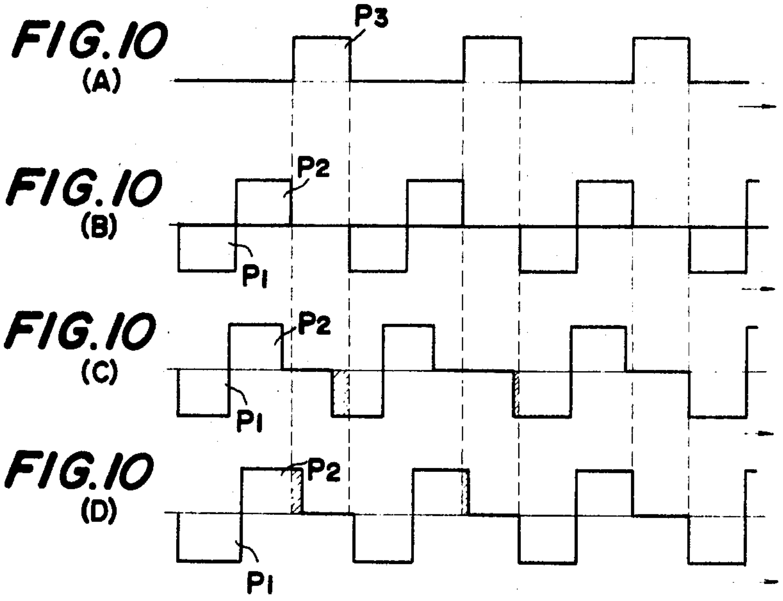

Film projection speed control switch 115 rotates in the direction of the arrow as described with reference to FIg. 7 when the electric motor 122 of projector 23 is operated. The manner in which switch 115 opens and closes will be described by using pulses. As shown in FIG. 10B, a pulse $P_1$ below the transverse axis indicates that brushes 118 and 119 are in a state in which a current is passed thereto; a pulse $P_2$ above the transverse axis indicates that brushes 118 and 120 are in a state in which a current is passed thereto; and no current is passed to the brushes when the pulse level is on the transverse axis. The time elapses is going rightwardly along the transverse axis. FIG. 10A shows the state in which a current is passed to thyristor 99.

If, for some reason, the film projection speed of projector 23 is increased above a predetermined level, then the time required for the opening and closing cycle of film projection speed control switch 115 to take place is reduced and the time required for producing pulses $P_1$ and $P_2$ is accordingly reduced, with a result that pulses $P_3$ and $P_1$ partly overlap each other as shown in FIG. 10C.

This state can be explained with reference to FIG. 5 as follows:

A current is passed between the brushes 118 and 119 of film projection speed control switch 115 when bidirectional thyristor 99 is fired, so that resistor 121 is connected in shunt with opposite ends of the armature 123 of the electric motor 122 of projector 23 through brushes 118 and 119, terminals 53 and 59 of sockets 31 and 32, thyristor 99 and terminals 52 and 58 of sockets 31 and 32. This reduces the combined resistance of a closed circuit comprising field coil 125, armature 123, variable resistor 129 and power source and a field current is accordingly increased. Thus, the rate of rotation of the electric motor 122 of projector 23 is reduced, thereby correcting the film projection speed.

On the other hand, if the film projection speed of projector 23 is reduced for some reason, the time required for the opening and closing cycle of the film projection speed control switch 115 to take place will be increased, so that pulses $P_2$ and $P_3$ will partly overlap each other as indicated by a hatched portion in FIG. 10D.

This state can be explained with reference to FIG. 5 as follows:

A current is passed between the brushes 118 and 120 of film projection speed control switch 115 when bidirectional thyristor 99 is fired, so that a closed series circuit comprising terminals 52 and 58 of sockets 31 and 32, thyristor 99, terminals 53 and 59 of sockets 31 and 32, brushes 118 and 120 of film projection speed control switch 115 and switch 127 is conected with opposite ends of variable resistor 129. This causes opposite ends of resistor 129 to be short-circuited, and a high voltage is accordingly impressed on field coil 125 and armature 123. Thus, the rate of rotation of the electric motor 122 of projector 23 is increased and film projection speed is instantly corrected.

From the foregoing description, it will be appreciated that according to this invention the filmm projection speed can be corrected each time a current is passed through thyristor 99 and cut off, so that it is possible to obtain complete synchronization of sound with scenes on the movie.

If the operation for after-recording described with reference to FIg. 4 is performed, the terminals 47 and 61 and 48 and 62 of sockets 26 and 36 respectively and the terminals 49 and 55 and 50 and 56 of sockets 31 and 32 will be electrically connected, the terminals *b* and *c* of slide switches 30*a* and 30*b* will be electrically connected, and the terminals *a* and *b* of switch 89 will be electrically connected.

If the switch 113 of tape recorder 22 is closed, the switch 127 of projector 23 is opened and a voltage is applied on power source terminals 126 and 130 to actuate the electric motor 122 of projector 23, then tape recorder 22 is started as described with reference to FIG. 9 and at the same time the terminals 61 and 62 of socket 36 are opened and closed by the brushes 118 and 120 of film projection speed control switch 115. Accordingly, outputs of oscillator circuit 87 are formed into pulses of a speed control pulse signal by the brushes 118 and 120 of film projection speed control switch 115. Thereafter, sound synchronized with scenes on the movie is recorded in the manner described with reference to sound recording.

If the operation of substituting sound of a different program for a part of the sound recorded as described with reference to FIG. 4 is performed, the terminals 49 and 55, 50 and 56, 51 and 57, 52 and 58, 53 and 59 and 54 and 60 of sockets 31 and 32 respectively will be electrically connected, and the contacts of slide switches 30*a* to 30*e* will be set at terminals *c* and *d*, so that the terminals *c* and *d* are electrically connected.

If the operation as described with reference to film projection and sound playback is performed at this time, then it is possible to project the film and reproduce sound synchronous with scenes on the movie in the manner described with reference to film projection and sound reproduction. When any scene in which sound substitution is desired is projected, sound substitution button switch 40 is depressed and sound of the new program is produced. This results in the sound recorded in the second channel of the tape recorder being erased by head 109 and at the same time new sound being recorded by head 105, thereby permitting to effect sound substitution for the desired scene. The speed control pulse signal recorded in the first channel of the tape recorder remains recorded as it is.

When it is desired to cut a certain part of the film, the end can be attained by providing the aforesaid electrically conducting tape to the front and rear of the part of the film desired to cut out. This is because the movement of the film and the tape synchronous therewith can be interrupted in a position on the film in which it is desired to effect cutting by performing the operation described with reference to film projection and sound reproduction.

From the foregoing description, it will be appreciated that this invention permits to readily and positively effect not only recording and reproduction of sound on a tape in synchronism with shooting a movie and projection of the same but also editing of the film and tape, after recording and partial sound substitution.

In this invention, the delay circuit 71 of tape recorder start stop control section for detecting the starting of movie camera 21 at the same time as the shutter for camera 21 starts rotating so as to start tape recorder 23 shown in FIG. 5 may be replaced by another control device which attains the same end by means of a switching circuit using transistors. Such control device will be explained with reference to FIG. 11 to FIG. 17.

Figure 11:
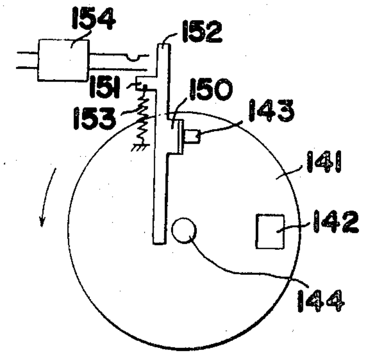
FIG. 11, FIG. 12 and FIG. 13 are views in explanation of the relation between a shutter disk and release bar in the camera of the apparatus according to this invention.
Figure 12:
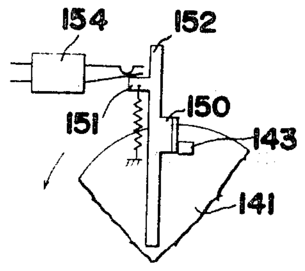
Figure 13:
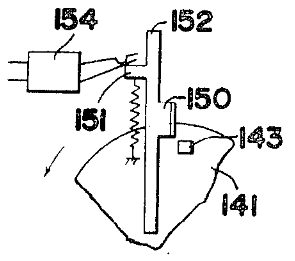

Means for synchronizing the starting and stopping of the camera with those of the tape recorder will be described with reference to FIGS. 11, 12 and 13 showing the relation between a shutter actuation means of the movie camera and a switch for forming and breaking power supply circuit for the electric motor.

Figure 14:
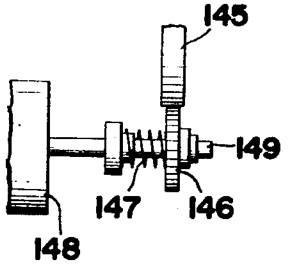
FIG. 14 is a schematic view of the operating portion of the camera of the apparatus according to this invention.

In FIG. 11, a shutter disk 141 has a shutter window 142 and a projection 143 and supported by a shaft 144. Shaft 144 is frictionally connected to a drive shaft 149 of an electric motor through gears 145 and 146 and a friction spring 147 as shown in FIG. 14. Disposed on one side of projection 143 is a shutter release bar 152 having a lock member 150 and an arm 151 and urged to move downwardly by the biasing force of a spring 153. Lock member 150 normally locks projection 143 to preclude the rotation of disk 141.

On the other hand, a normally open switch 154 is secured to an immovable member disposed leftwardly upwardly of release bar 152 in FIG. 11. A contact of switch 154 which is normally open extends to the zone of movement of arm 151 of release bar 152.

FIGS. 12 and 13 show displacements which take place in an instant in the movie camera described above when started and stopped. Shooting of a movie by the camera is carried out when release bar 152 is moved upwardly. If release bar 152 is slightly moved upwardly, then the contact of switch 154 is closed to supply power to electric motor 148 but the lock member 150 of release bar 152 is still in the zone of movement of projection 143 integral with disk 141 as shown in FIG. 12, so that the rotation of disk 141 is precluded.

If release bar 152 is moved to the last point of its stroke, then lock member 150 is released from engagement with projection 143 while the contact of switch 154 still remains closed, so that disk 141 begins to rotate in the direction of an arrow. One frame of the film is exposed each time disk 141 makes one complete revolution.

When the movie camera is stopped, the aforementioned operation is reversed in order and the various elements involved operate in the order of FIG. 13, FIG. 12 and FIG. 11, each element acting similarly as when the camera is started.

Release bar 152 is generally operated manually, so that unlocking of disk 141 simultaneously as the closing of switch 154 cannot be expected to occur at all times. Even if release bar 152 were actuated by electromagnetic actuation means or instantaneous actuation means, it would be very difficult to achieve a good timing of unlocking of disk 141 with the closing of switch 154 in view of the aforementioned allowance of $\pm 0.1$ second.

It has been ascertained that in the movie camera of the construction described above the value of a current passed to electric motor 148 and the value of a voltage impressed thereon differ from the state shown in FIG. 12 to the state shown in FIG. 13. Based on this finding, means is provided in this invention for detecting variations in the current and voltage by an electronic circuit and causing such circuit to effect control of the tape recorder, so as to thereby positively effect synchronization of starting and stopping of the movie camera with those of the tape recorder.

Figure 15:
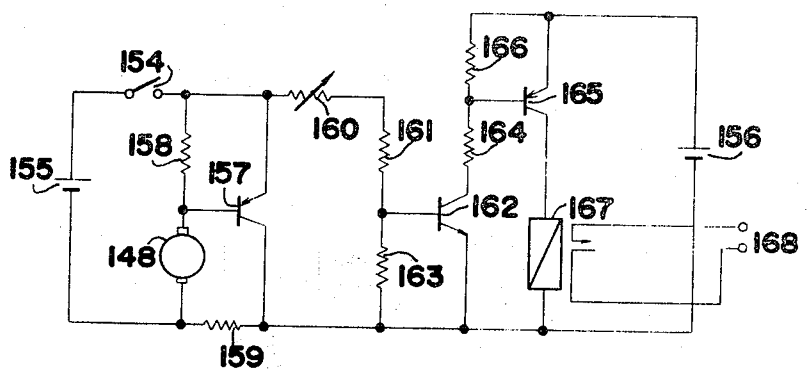
FIG. 15 is a diagram of a circuit used with a control device for the tape recorder.

The electric circuit shown will now be described in detail. In FIG. 15, 155 and 156 are power sources, and a transistor 157 has a base terminal which is connected to the positive electrode of power source 155 through a resistor 158 and the switch 154 as well as to a terminal of the electric motor 148. Another terminal of electric motor 148 is connected to the negative electrode of power source 155 and to the negative electrode of power source 156 through a resistor 159.

Transistor 157 has a collector terminal connected to the negative electrode of power source 156 and an emitter terminal connected to the base terminal of transistor 162 through a variable resistor 160 and a fixed resistor 161 connected in series. The base terminal of transistor 162 is connected to the negative electrode of power source 156 through a resistor 163, the emitter terminal thereof is connected to the negative electrode of power source 156, and the collector terminal thereof is connected to the base terminal of a transistor 165 through a resistor 164.

The base terminal of transistor 165 is connected to the positive electrode of power source 156 through a resistor 166, the emitter terminal thereof is connected to the positive electrode of power source 156, and the collector terminal thereof is connected to the negative electrode of power source 156 through a relay coil 167.

A normally open relay contact actuated as relay coil 167 is energized is connected to a remote control terminal 168 of the tape recorder.

Figure 17:
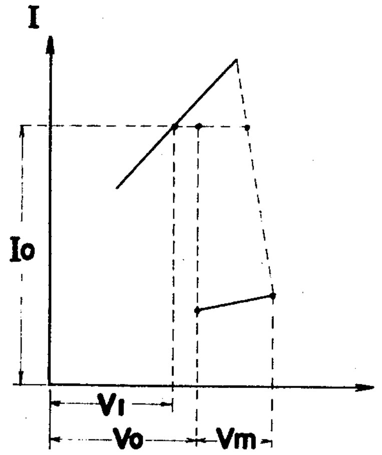
FIG. 17 is a view in explanation of relation between the current supplied to the electric motor and the voltage of the power source when the relation between the shutter disk and release bar is as shown in FIG. 11, FIG. 12 and FIG. 13.

Operation of the tape recorder control device having the aforementioned circuit will now be explained with reference to FIGS. 16 and 17.

In FIG. 12, shutter disk 141 is shown as having its rotation precluded in spite of the fact that switch 154 is closed as aforementioned. At this time, electric motor 148 is frictionally rotated by friction spring 147 shown in FIG. 14 but it is an overload condition, so that the motor current I is increased and the voltage V of power source 155 is reduced in value as indicated by a time T1 in FIG. 16.

Figure 16:
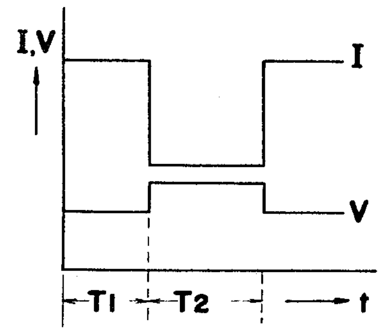
FIG. 16 is a view in explanation of the operation of transistors of FIG. 15.

When the state shown in FIG. 13 occurs, electric motor 148 is under constant operation condition, so that the current I is reduced and the power source voltage V is increased in value as indicated by a time T2 in FIG. 16.

On the other hand, the operation of transistor 157 is determined by the motor current I if the resistance value of resistor 158 is constant. The relation between motor current I and power source voltage V and the operation of transistor 157 will be explained with reference to FIG. 17. In FIG. 17, the symbol Io is a minimum essential of motor current for operating transistor 157, $V_1$ is a minimum essential of power source voltage of power source 155 for operating transistor 157, $V_m$ is a range of voltages in which power source 155 can be used, and $V_o$ is a range of voltages in which power source 155 cannot be used.

Assuming that power source 155 has a sufficient capacity and is capable of use, the current passed to electric motor 148 will be higher in value than Io when the state shown in FIG. 12 prevails and motor current I and power source voltage V are within time T1 shown in FIG. 16. This causes a rise in the terminal voltage of resistor 158 between the base and emitter of transistor 157 to provide a voltage sufficiently high for causing transistor 157 to operate, so that transistor 157 is turned on and no voltage is impressed on resistors 160, 161 and 163, and therefore transistors 162 and 165 are not turned on. The voltage impressed between the base and emitter of transistor 157 is determined by resistor 158 and the strength of friction spring 147.

When the relation between the disk 141 and switch 154 of camera is in the state shown in FIG. 13 or when motor current I and power source voltage V is in the range of time $T_2$ as shown in FIG. 16, the motor current is greatly reduced in value below the level Io necessary for actuating transistor 157, so that transistor 157 is turned off and a voltage is impressed on resistors 160, 161 and 163. This results in transistor 162 and hence transistor 165 being turned on, so that a relay coil 167 is excited and the relay contact is closed. This starts the tape recorder connected to such relay contact.

When shooting of a movie is interrupted, the relation between the disk 141 and switch 154 of the camera shifts from the state shown in FIG. 13 to that of FIG. 12 and then to that of FIG. 11. It is thus possible to start or stop the tape recorder in synchronism with the starting and stopping of the movie camera.

Let us now turn to the operation of the control device when the capacity of power source 155 is reduced below the voltage range $V_m$ in which power source 155 can be used.

When the state shown in FIg. 12 prevails, the current passed to electric motor 148 increases in value but does not exceed beyond $I_0$ because the capacity of power source 155 is low, with the power source voltage also being reduced below $V_1$. Accordingly, transistor 157 remains in off position and the terminal voltage of resistor 163 between the base and emitter of transistor 162 is low, so that transistors 162 and 165 remains in off position and relay coil 167 is not excited. The tape recorder is not thus started. When the state shown in FIG. 13 prevails, the current passed to electric motor 148 is further reduced, so that the transistor circuit still remains inoperative and the tape recorder is not started.

The use of the tape recorder control device constructed and operating as aforementioned is effective to remove or minimize the chance of a failure in achieving synchronism of sound with film movement because the tape recorder provided with such control device responds quickly to the starting and stopping of the movie camera.

The reason why tape recorder 22 is started with a time lag by the tape recorder control device comprising delay circuit 71 of FIG. 5 has been explained with reference to FIG. 9. The device shown in FIG. 18 is intended to eliminate, by rotating the electric motor of tape recorder 22 in the reverse direction in conjunction with the termination of operation of camera 21, the development of an excess length of tape which would otherwise develop when tape recorder 22 is stopped after movie camera 21 is stopped.

Figure 18:
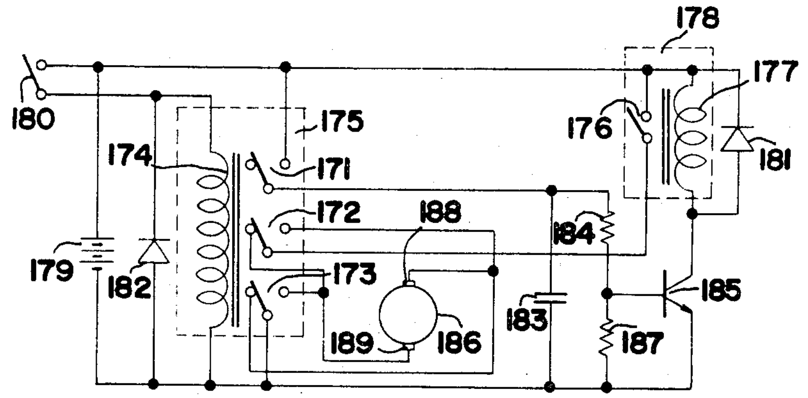
FIG. 18 is a diagram of an electric circuit for the tape recorder control device.

In FIG. 18, an opening and closing switch 171 and change-over switches 172 and 173 constitute a relay 175 together with an electromagnet 174, and a switch 176 and an electromagnet 177 constitute another relay 178.

The positive electrode of a power source 179 is connected to one terminal of a switch 180, a fixed terminal of switch 171, a fixed terminal of switch 176, one end of a coil of electromagnet 177 and one terminal of a rectifier 181. The other terminal of switch 180 is connected to the negative electrode of power source 179 through another rectifier 182 which is connected in parallel with a coil of electromagnet 174. A movable contact of switch 171 is connected to the negative electrode of power source 179 through a capacitor 183 as well as to the base terminal of a transistor 185 through a resistor 184. Switch 172 has a normally open fixed terminal connected to one terminal of an electric motor 186 and the normally closed fixed terminal of switch 173, a movable contact connected to the movable contact of switch 176, and a normally closed fixed terminal connected to the normally open fixed terminal of switch 173 and the other terminal of electric motor 186.

The movable contact of switch 173 and the emitter terminal of transistor 185 are connected to the negative electrode of power source 179. The base terminal of transistor 185 is connected to the negative terminal of power source 179 through a resistor 187, and the collector terminal thereof is connected to the other terminal of rectifier 181 and the other end of the coil of electromagnet 177.

If switch 180 is closed, an exciting circuit for electromagnet 174 will be formed. Movable contacts of switches 171, 172 and 173 are brought into contact with respective fixed terminals of the switches to form a circuit comprising power source 179, switch 171 and capacitor 183. Capacitor 183 is thus charged, and a voltage is impressed between the base and emitter of transistor 185 through a branch formed by resistors 184 and 187 upon completion of charging of the capacitor. Consequently, a current is passed through the collector and emitter of transistor 185, and an exciting circuit for electromagnet 177 comprising power source 179, electromagnet 177 and transistor 185 is formed. This closes switch 176 to form a circuit comprising power source 179, normally open fixed terminal of switch 172, an input terminal 188 for normal direction rotation of electric motor 186, an output terminal 189 of motor 186, and normally open fixed terminal of switch 173, so that electric motor 186 rotates in the normal direction.

If switch 180 is opened, electromagnet 174 will be de-energized and switches 171, 172 and 173 are restored to their positions shown in the figure, so that power supply to capacitor 183 and resistors 184 and 187 is interrupted. However, the charge stored in capacitor 183 is discharged through resistors 184 and 187 to maintain the base emitter voltage of transistor 185 for a short while. This is effective to hold the exciting circuit of electromagnet 177, so that an electric motor reverse direction rotation circuit is formed comprising power source 179, switch 176, normally closed fixed terminal of switch 172, terminal 189 for reverse direction rotation of electric motor 186, terminal of motor 188, and normally closed fixed terminal of switch 173. Electric motor 186 thus tends to rotate in the reverse direction and cancels the inertia of normal direction rotation of a capstan shaft and a flywheel associated with an output shaft of motor 186. This causes the tape transport mechanism to instantly stop operating. The charge stored in capacitor 183 is exhausted and transistor 185 is brought to an inoperative position with a result that electromagnet 177 is de-energized and switch 176 is opened. Power supply to electric motor 186 is thus interrupted.

Rectifiers 181 and 182 constitute a bypass for a surge current produced by electromagnets 177 and 174 so as to eliminate adverse effects which the surge current might otherwise have on the operation of the tape recorder control device.

From the foregoing description, it will be appreciated that the apparatus according to this invention can be started and stopped by merely opening and closing a switch and that it is thus possible to operate the apparatus by remote control. Besides, the brake is electrically applied to the electric motor of the tape recorder, so that mechanical elements can be eliminated and the internal structure of the tape recorder can be simplified and yet the motor responds quickly to the actuation of the swtich for interrupting the rotation of tape.

By using a tape recorder incorporating this feature in association with a movie camera for synchronous recording of sound, it is possible to interrupt the operation of the tape recorder in syncrhonism with the interruption of operation of the movie camera and to effect synchronization of sound with film movement without developing an excess length of the tape.

What is claimed is:

1. An appartus for synchronizing the movement of a visual image recording film and an audio signal information recording medium, comprising:

means for transporting said visual image film past an image conversion station, including a film transport motor, a power supply and first switching means interposed between said power supply and said film transport motor;

means for transporting said audio information medium past a recording or reproducing station, including an audio medium transport motor;

a delay circuit coupled to said power supply through said first switching means, including a switching transistor coupled in parallel with said film transport motor and means for switching said switching transistor between first and second states when a motor drive current for said film transport motor reaches a predetermined value;

further switching means coupled to the output of said delay circuit, said further switching means switching from a first to a second state when said second transistor is switched into its second state; and means coupling said further switching means to said audio medium transport motor to connect said audio medium transport motor to said power supply when said further switching means is switched into its second state.

2. The apparatus according to claim 1, further comprising resistance means coupled in series with said film transport motor and said power supply; and wherein said switching transistor comprises base and emitter electrodes coupled to first and second terminals of said resistance means, respectively, and a collector electrode coupled to said power supply.

3. The apparatus according to claim 2, wherein the junction of said emitter and said resistance means is coupled to said power supply; and said further switching means comprises first and second resistors coupled between the emitter and collector electrodes of said switching transistor and a further switching transistor having its base electrode coupled to the junction between said first and second resistors, the output of said further switching transistor being coupled to said means coupling said further switching means to said audio medium transport motor.

4. An apparatus for synchronizing the movement of a visual image recording film and an audio signal information recording medium, comprising:

means for transporting said visual image film past an image conversion station, including a film transport motor, a power supply and first switching means interposed between said power supply and said film transport motor;

means for transporting said audio information medium past a recording or reproducing station, including an audio medium transport motor;

a delay circuit coupled to said power supply through said first switching means, including means generating an output signal when a motor drive current for said film transport motor reaches a predetermined value;

second switching means coupled to the output of said delay circuit, said second switching means switching from a first to a second state when said output signal is generated by said delay circuit;

means coupling said second switching means to said audio medium transport motor to connect said audio medium transport motor to said power supply when said second switching means is switched into its second state; and third switching means interposed between said audio medium transport motor and said second switching means, said third switching means being switched from a first to a second state when said second switching means is switched from its second to first states, respectively, wherein, in its first state, said third switching means couples said audio medium transport motor to said power supply in a first direction to drive said audio medium transport motor in a forward direction, and in its second state, said third switching means couples said audio medium transport motor to said power supply in a second direction to drive said audio medium transport motor in a reverse direction to counteract the affect of inertia of motion of said audio medium transport means.

5. An apparatus for synchronizing the movement of a visual image recording film and an audio signal information recording medium, comprising:

means for transporting said visual image film past an image conversion station, including a film transport motor and a power supply coupled to said motor;

means for transporting said audio information medium past a recording or reproducing station, including an audio medium transport motor coupled to said power supply;

first switching means coupled to said film transport motor, said first switching means having a first set of contacts which open and close in synchronism with the rotation of said film transport motor;

pulse signal generating means coupled to said first set of contacts for generating a pulse signal upon the closing of said first set of contacts;

transducing means coupled to the output of said pulse signal generating means for recording said pulse signals onto and reproducing said pulse signals from said audio information medium;

first resistance means coupled in series with the armature of said film transport motor;

second resistance means coupled between said armature and a second set of contacts of said first switching means;

second switching means coupled to said transducing means, said second switching means closing and opening in response to the presence and absence, respectively, of a pulse signal reproduced from said audio information medium; and means coupling said first and second switching means together to connect said second resistance means in parallel with said armature when said second set of contacts and said second switching means are closed concurrently and to short out said first resistance means when said first set of contacts and said second switching means are closed concurrently.

6. The apparatus according to claim 5, wherein said first switching means further comprises means to alternately close said first and second sets of contacts such that only one of said sets of contacts may be closed at a time.

* * * * *